(12) United States Patent
Zhou et al.

(10) Patent No.: US 11,282,666 B2
(45) Date of Patent: Mar. 22, 2022

(54) CIRCUIT PROTECTION SYSTEM WITH INDUCTION HEATING TRIGGER AND METHODS

(71) Applicant: EATON INTELLIGENT POWER LIMITED, Dublin (IE)

(72) Inventors: Xin Zhou, Wexford, PA (US); Robert Stephen Douglass, Wildwood, MO (US)

(73) Assignee: EATON INTELLIGENT POWER LIMITED, Dublin (IE)

( * ) Notice: Subject to any disclaimer, the term of this patent is extended or adjusted under 35 U.S.C. 154(b) by 589 days.

(21) Appl. No.: 15/987,003

(22) Filed: May 23, 2018

(65) Prior Publication Data

US 2019/0362924 A1    Nov. 28, 2019

(51) Int. Cl.
*H01H 85/00* (2006.01)
*H02H 1/00* (2006.01)
*H01H 85/165* (2006.01)
*H01H 85/055* (2006.01)
(Continued)

(52) U.S. Cl.
CPC ...... *H01H 85/0047* (2013.01); *H01H 85/055* (2013.01); *H01H 85/143* (2013.01); *H01H 85/165* (2013.01); *H02H 1/0007* (2013.01); *H02H 3/00* (2013.01)

(58) Field of Classification Search
CPC ............... H01H 85/00; H01H 85/0039; H01H 85/0047; H01H 85/0052; H01H 85/0056; H01H 85/006; H01H 85/0065; H01H 85/0069; H01H 85/0073; H01H 85/02; H01H 85/04–048; H01H 85/05; H01H 85/055; H01H 85/06–12; H01H 85/143; H01H 85/15; H01H 85/165; H01H 2085/0483; H01H 37/72; H01H 37/74; H01H 37/76; H01H 37/761; H01H 37/767; H01H 2085/466; H01H 61/02; H02H 1/00; H02H 1/0007; H02H 1/003; H02H 1/06; H02H 1/063; H02H 1/066; H02H 3/00; H02H 3/046; H02H 3/08; H02H 3/085; H02H 3/10; H02H 3/105; H02H 3/16; H02H 3/32; H02H 3/33; H02H 3/331; H02H 3/332
USPC ........ 361/39, 41, 42, 62, 63, 65, 78, 79, 86, 361/87, 92, 93.1, 93.2, 93.8, 99, 103, 361/104, 106, 115, 117, 118, 119, 124, 361/142, 143, 160–162, 164, 165, 275.1,
(Continued)

(56) References Cited

U.S. PATENT DOCUMENTS

5,252,942 A * 10/1993 Gurevich ............. H01H 85/055
337/163
8,890,483 B2 * 11/2014 Nakatsuji ................ H01M 2/34
320/134
(Continued)

*Primary Examiner* — Thienvu V Tran
*Assistant Examiner* — Carlos O Rivera-Perez
(74) *Attorney, Agent, or Firm* — Armstrong Teasdale LLP (57) ABSTRACT

A circuit protection system including at least one fuse including a fuse element, at least one inductive heating element operable to heat the fuse element, at least one control module in communication with the inductive heating element, and at least one current detection device coupled to said control module. The control module is configured to operate the inductive heating element and cause the fuse element to open in response to a predetermined current condition.

6 Claims, 12 Drawing Sheets

(51) Int. Cl.
*H01H 85/143* (2006.01)
*H02H 3/00* (2006.01)

(58) Field of Classification Search
USPC ............ 361/275.4, 626, 628, 630, 642, 646; 337/158–160, 168
See application file for complete search history.

(56) References Cited

U.S. PATENT DOCUMENTS

| | | | | |
|---|---|---|---|---|
| 2010/0259354 | A1* | 10/2010 | Ohtsuka | H01H 87/00 337/21 |
| 2012/0050936 | A1* | 3/2012 | Douglass | H01C 7/126 361/111 |
| 2015/0071394 | A1* | 3/2015 | Miyanaga | H04L 7/04 375/362 |
| 2015/0348731 | A1* | 12/2015 | Douglass | H01H 85/175 337/198 |
| 2017/0213681 | A1* | 7/2017 | Gubel | H01H 61/02 |

* cited by examiner

CIRCUIT PROTECTION SYSTEM WITH INDUCTION HEATING TRIGGER AND METHODS

BACKGROUND OF THE INVENTION

The field of the invention relates generally to electrical circuit protection systems and methods of operation, and more specifically to the operation of electrical circuit protection systems including high voltage electrical fuses and induction triggering technology.

Circuit protection systems including an electrical fuse are widely used as overcurrent protection devices to prevent costly damage to electrical circuits. Circuit protection systems typically form an electrical connection between an electrical power source or power supply and an electrical component or a combination of components arranged in an electrical circuit. The circuit protection system includes an electrical fuse having one or more fusible links or elements, or a fuse element assembly connected between the fuse terminals, so that when electrical current flowing through the fuse exceeds a predetermined limit, the fusible elements melt and opens one or more circuits through the fuse to prevent electrical component damage.

Circuit protection systems that include electrical fuses are operable in high voltage electrical power systems to safely interrupt both relatively high fault currents and relatively low fault currents with equal effectiveness. In view of constantly expanding variations of electrical power systems, known systems of this type are disadvantaged in some aspects. Improvements in circuit protection systems are desired to more fully meet the needs of the marketplace.

BRIEF DESCRIPTION OF THE DRAWINGS

Non-limiting and non-exhaustive embodiments are described with reference to the following Figures, wherein like reference numerals refer to like parts throughout the various drawings unless otherwise specified.

DETAILED DESCRIPTION OF THE INVENTION

Electric vehicle manufacturers, data center owners, and providers of renewable energy are seeking circuit protection systems containing fusible elements for electrical power systems presenting fault current levels much lower than traditional electrical systems, but for which conventional fuses specified for such fault conditions are unsuitable in view of extremely high thermal stress and associated premature failure.

Exemplary embodiments of a circuit protection system are described below that address these and other difficulties. Relative to known high voltage circuit protection systems, the exemplary circuit protection system embodiments advantageously offer a relatively high power handling capacity, higher voltage operation, time-current operation, on demand activation, and the ability to adjust activation based on the electrical system protection needs. As explained below, the exemplary circuit protection system embodiments are designed and engineered to provide very high current limiting performance as well as on demand activation to meet specific safety requirements. Method aspects will be in part explicitly discussed and in part apparent from the discussion below.

While described in the context of EV applications and a particular type of circuit protection system having certain features discussed below, the benefits of the invention are not necessarily limited to EV applications or to the particular circuit protection system containing fuse types or ratings described. Rather the benefits of the invention are believed to more broadly accrue to many different power system applications and can also be practiced in part or in whole to construct different types of circuit protection systems having similar or different capabilities than those discussed herein.

Figure 1:
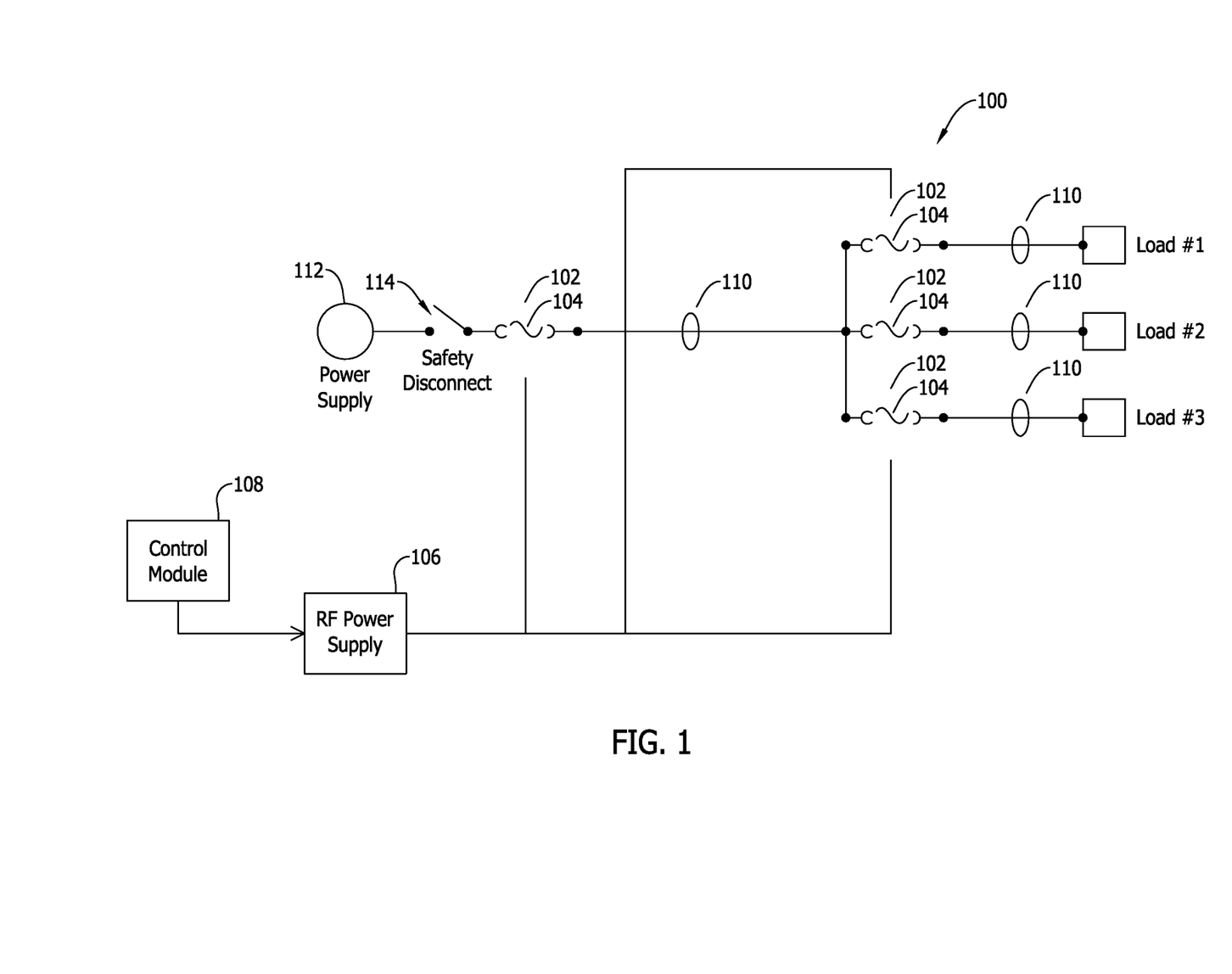
FIG. 1 is a schematic diagram of a circuit protection system.

FIG. 1 is a schematic diagram of an exemplary circuit protection system 100. In the exemplary embodiment, circuit protection system 100 includes at least one fuse holder 102 in combination with a fuse 104, wherein the fuse holder 102 is an inductive coil fuse holder coupled to at least one RF power supply 106. In the exemplary embodiment, RF power supply 106 is configured to supply high frequency power to fuse holder 102.

In the exemplary embodiment, fuse holder 102 includes an inductive heating element. In the exemplary embodiment the inductive heating element is a coil, however the inductive heating element may be any apparatus that supports creating induction heating within fuse holder 102. The inductive heating element is configured to be energized by the high frequency power supplied by RF power supply 106. Additionally, upon being energized by RF power supply 106, the inductive heating element is configured to heat fuse 104 such that the fuse element assembly melts, opening the electrical circuit. Circuit protection system 100 further includes at least one control module 108 coupled to RF power supply 106 and at least one current detection device 110. Control module 108 is configured to control the operation of RF power supply 106 in response to a signal from current detection or input from an operator.

Additionally or alternatively, control module 108 may be configured to send a control signal to RF power supply 106 such that high frequency power is supplied to the inductive heating element upon the request of an operator. In the exemplary embodiment the current detection device is a current sensor 110 configured to detect changes in current within circuit protection system 100, additionally, current sensor 110 is configured to send a control signal to RF power supply 106 such that high frequency power is supplied to the inductive heating element when a predetermined fault condition is detected. Circuit protection system 100 further includes a power supply 112 coupled via a safety disconnect 114 to a fuse holder 102, wherein power supply 112 is configured to supply power to the electrical system until disconnected by one of the safety disconnect 114 or fuse holder 102. In the exemplary embodiment, a current sensor 110 is coupled between a fuse holder 102 and each of an external load 116.

In operation, current sensor 110 is configured to detect a predetermined electrical fault condition by detecting current and voltage monitoring signals to determine if one of a short circuit event, ground fault event, overload event, or arc fault event is occurring. When an electrical fault condition is detected, current sensor 110 sends a signal to control module 108. Control module 108 then sends a signal to RF power supply 106. Control module 108 controls RF power supply 106, such that it supplies high frequency power to fuse holder 102. When high frequency power is supplied to fuse holder 102, the inductive coil within fuse holder 102 is energized. The energized inductive coil generates a high frequency electromagnetic induction flux field at the center of the fuse element. The high frequency electromagnetic induction flux field causes a portion of the fuse element assembly to melt, disintegrate, or otherwise structurally fail and opens the circuit path within electrical fuse 104. Load side circuitry is therefore electrically isolated from the line side circuitry, via operation of the fuse element assembly, to protect load side circuit components and circuitry from damage when electrical fault conditions occur. In effect, the fuse is operable on demand outside of and independent from its time-current curve that is built-in to the fuse design.

Additionally or alternatively, upon request by an operator control module 108 sends a signal to RF power supply 106. Control module 108 controls RF power supply 106, such that it supplies high frequency power to fuse holder 102. When high frequency power is supplied to fuse holder 102, the inductive coil within fuse holder 102 is energized. The energized inductive coil generates a high frequency electromagnetic induction flux field. The high frequency electromagnetic induction flux field causes a portion of the fuse element assembly to melt, disintegrate, or otherwise structurally fail and opens the circuit path within electrical fuse 104. Load side circuitry is therefore electrically isolated from the line side circuitry, via operation of the fuse element assembly, to protect load side circuit components and circuitry from damage when on demand activation of the inductive heating element is requested by an operator.

Figure 2:
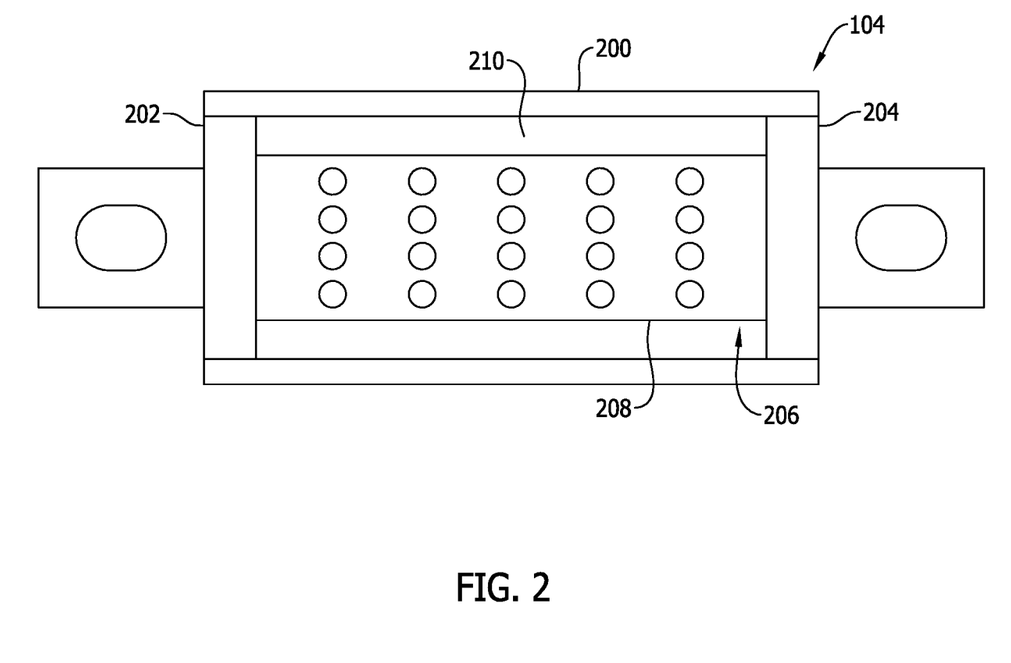
FIG. 2 is a partial top view of an electrical fuse for use in the circuit protection system of FIG. 1, revealing the internal construction thereof.
Figure 3:
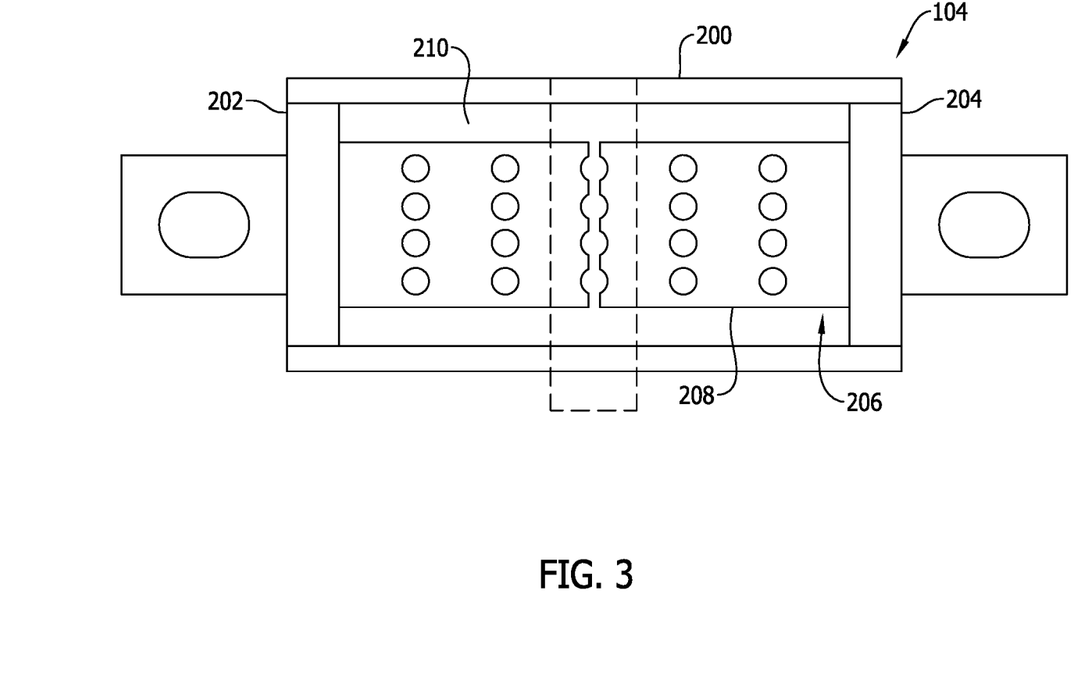
FIG. 3 is a top view of the electrical fuse of FIG. 2 after experiencing an induction heating event, revealing the internal construction thereof.

FIGS. 2 and 3 are similar views of the electrical fuse 104 for use in combination with fuse holder 102 (shown in FIG. 1), with a portion of the housing 200 shown transparent to reveal the internal construction, but FIG. 3 illustrates the effect of exposing electrical fuse 104 to an electromagnetic induction flux field generated by the induction heating element of fuse holder 102.

In the present embodiment, electrical fuse 104 includes a housing 200, first and second terminal assemblies 202, 204 configured for connection to fuse holder 102, and a fuse element assembly 206 including a fuse element 208 that completes an electrical connection between the terminal assemblies 202, 204. Terminal assemblies 202, 204 include fuse terminals 240, 242 respectively, having bolt-on connections for fastening to a conductor. An arc extinguishing filler medium or material 210 surrounds the fuse element assembly 206. In one contemplated embodiment, the filler medium 210 is composed of quartz silica sand and a sodium silicate binder. The quartz sand has a relatively high heat conduction and absorption capacity in its loose compacted state, but can be silicated to provide improved performance. For example, by adding a liquid sodium silicate solution to the sand and then drying off the free water, silicate filler material 210 may be obtained with the following advantages.

The silicate material 210 creates a thermal conduction bond of sodium silicate to the fuse element(s) 208, the quartz sand, the fuse housing 200, and the terminal assemblies 202, 204. This thermal bond allows for higher heat conduction from the fuse element(s) 208 to their surroundings, circuit interfaces and conductors. The application of sodium silicate to the quartz sand aids with the conduction of heat energy out and away from the fuse element 208.

The sodium silicate mechanically binds the sand to the fuse element, terminal and housing increasing the thermal conduction between these materials. Conventionally, a filler material which may include sand only makes point contact with the conductive portions of the fuse elements in a fuse, whereas the silicated sand of the filler material 210 is mechanically bonded to the fuse elements. Much more efficient and effective thermal conduction is therefore made possible by the silicated filler material 210.

When subjected to predetermined current conditions, at least a portion of fuse element 208 melts, disintegrates, or otherwise structurally fails and opens the circuit path through fuse element 208 between the terminal assemblies 202, 204. Load side circuitry is therefore electrically isolated from the line side circuitry, via operation of the fuse element 208, to protect load side circuit components and circuitry from damage when electrical fault conditions occur.

In the present embodiment, when subjected to a high frequency electromagnetic induction flux field from the energized inductive coil of fuse holder 102, at least a portion of fuse element 208 melts, disintegrates, or otherwise structurally fails and opens the circuit path through fuse element 208 between terminal assemblies 202, 204. Load side circuitry is therefore electrically isolated from the line side circuitry, via operation of the fuse element 208 to protect load side circuit components and circuitry from damage when electrical fault conditions occur.

While a particular fuse element geometry and arrangement is shown, other types of fuse elements, fuse element geometries, and arrangements of fuse elements are possible in other embodiments. The fuse element(s) need not be identically formed to one another in all embodiments. Further, in some embodiments a plurality of fuse elements may be utilized.

In the example shown, fuse element 208 defines a plurality of areas of reduced cross-sectional area, referred to in the art as weak spots. The weak spots are defined by round apertures in fuse element 208 in the example shown. The weak spots correspond to the thinnest portion of the section between adjacent apertures. The reduced cross-sectional areas at the weak spots will experience heat concentration as current flows through the fuse element 208, and the cross-sectional area of the weak spots is strategically selected to cause the fuse element 208 to open at the location of the weak spots when a high frequency electromagnetic induction flux field is introduced to fuse element 208.

Figure 4:
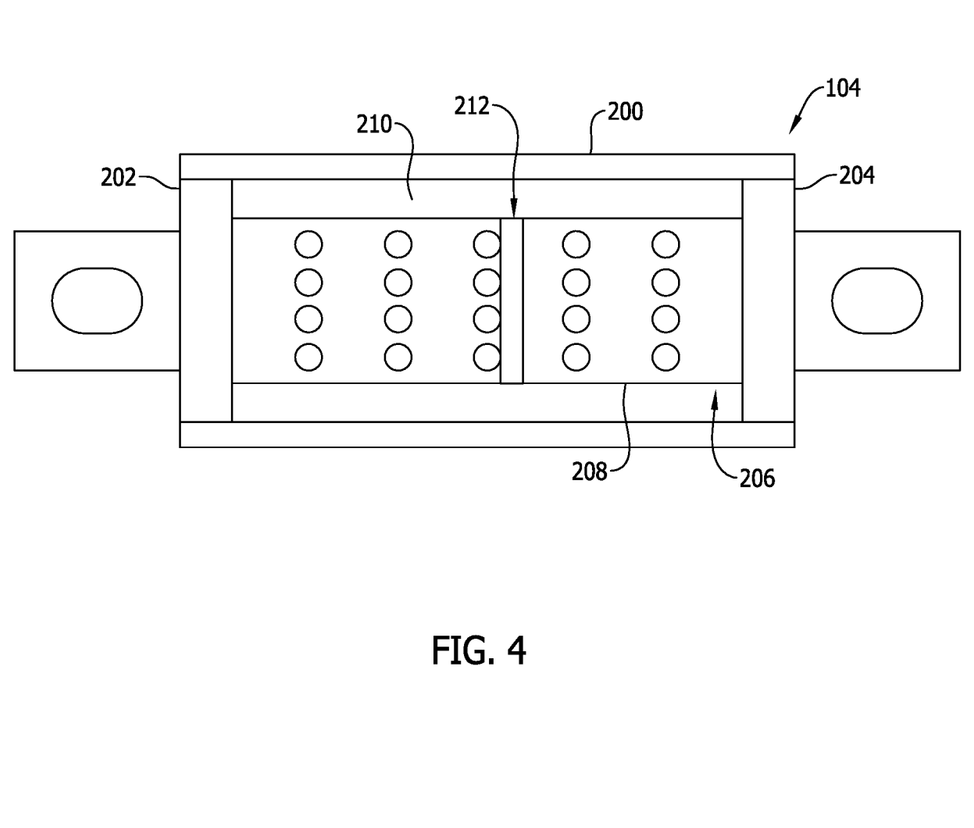
FIG. 4 is a top view of an electrical fuse for use in the circuit protection system of FIG. 1, revealing the internal construction thereof.
Figure 5:
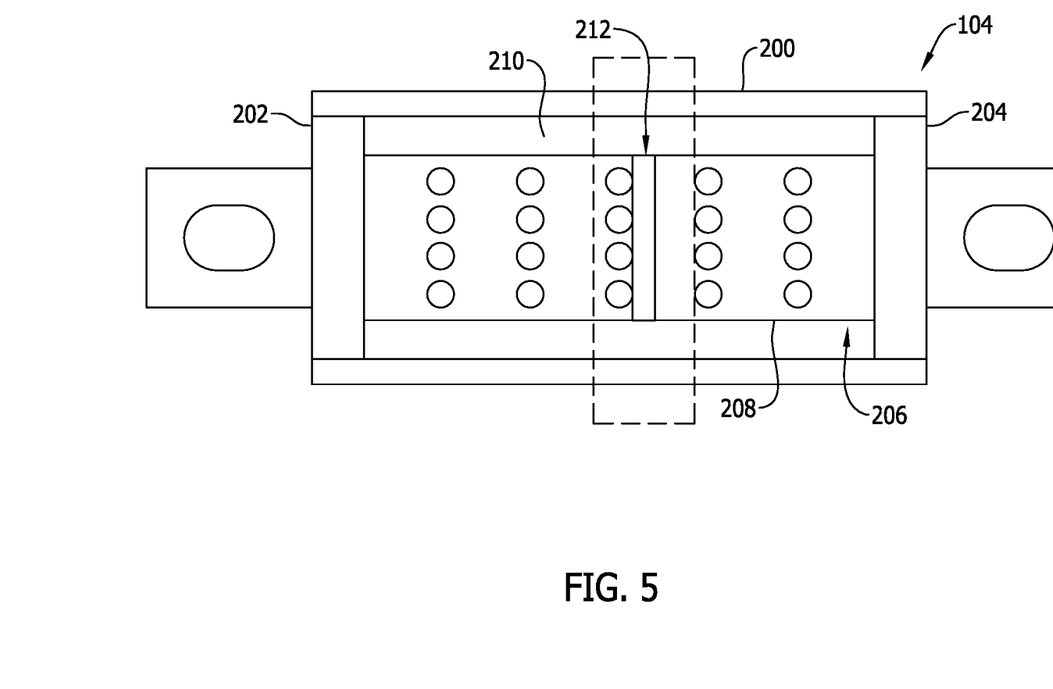
FIG. 5 is a top view of the electrical fuse shown in FIG. 4 after experiencing an induction heating event.

FIGS. 4 and 5 are similar views of an electrical fuse 104 for use in combination with fuse holder 102 (shown in FIG. 1), with a portion of the housing 200 shown transparent to reveal the internal construction, but FIG. 5 illustrates the effect of exposing electrical fuse 104 to an electromagnetic induction flux field generated by the induction heating element of fuse holder 102.

In the present embodiment, electrical fuse 104 includes a housing 200, first and second terminal assemblies 202, 204 configured for connection to fuse holder 102, and a fuse element assembly 206 including a fuse element 208 that completes an electrical connection between the terminal assemblies 202, 204. An arc extinguishing filler medium or material 210 surrounds the fuse element assembly 206. In one contemplated embodiment, the filler medium 210 is composed of quartz silica sand and a sodium silicate binder.

In the present embodiment, fuse element 208 includes a M-spot 212. The M-spot is a Metcalf effect (M-effect) coating where pure tin (Sn) is applied to the fuse element 208, fabricated from copper (Cu) in this example, that extends proximate the weak spots of one of the fuse element 208. During an inductive heating event the Sn and Cu diffuse together in an attempt to form a eutectic material. The result is a lower melting temperature somewhere between that of Cu and Sn or about 500° C. to about 700° C. in contemplated embodiments. The fuse element 208 and the section including the M-effect coating will therefore respond to current conditions that will not affect the remainder of the short circuit fuse element 208. While the M-effect coating is applied to one section of the fuse element 208 across the width of fuse element 208, adjacent to some of the weak points, the M-effect coating could be applied at additional sections if desired. Further, the M-effect coating could be applied as spots only at the locations of the weak spots in another embodiment as opposed to a larger coating as shown in FIGS. 4 and 5.

The present embodiment employs two fuse element melting mechanisms, one mechanism for high current operation (or short circuit faults) and one mechanism for low current operation (or overload faults) and on demand use via circuit protection system 100 (shown in FIG. 1). In the present embodiment, when subjected to a high current event, at least a portion of the fuse element 208 melts, disintegrates, or otherwise structurally fails and opens the circuit path through the fuse element 208 between terminal assemblies 202, 204. Load side circuitry is therefore electrically isolated from the line side circuitry, via operation of the fuse element 208, to protect load side circuit components and circuitry from damage when electrical fault conditions occur. In the present embodiment, when subjected to a high frequency electromagnetic induction flux field generated by the energized inductive coil of fuse holder 102, at least a portion of fuse element 208 and M-spot 212 diffuse together and structurally opens the circuit path through the fuse element 208 between terminal assemblies 202, 204. Load side circuitry is therefore electrically isolated from the line side circuitry, via operation of fuse holder 102 in combination with M-spot 212 to protect load side circuit components and circuitry from damage when electrical fault conditions occur.

Figure 6:
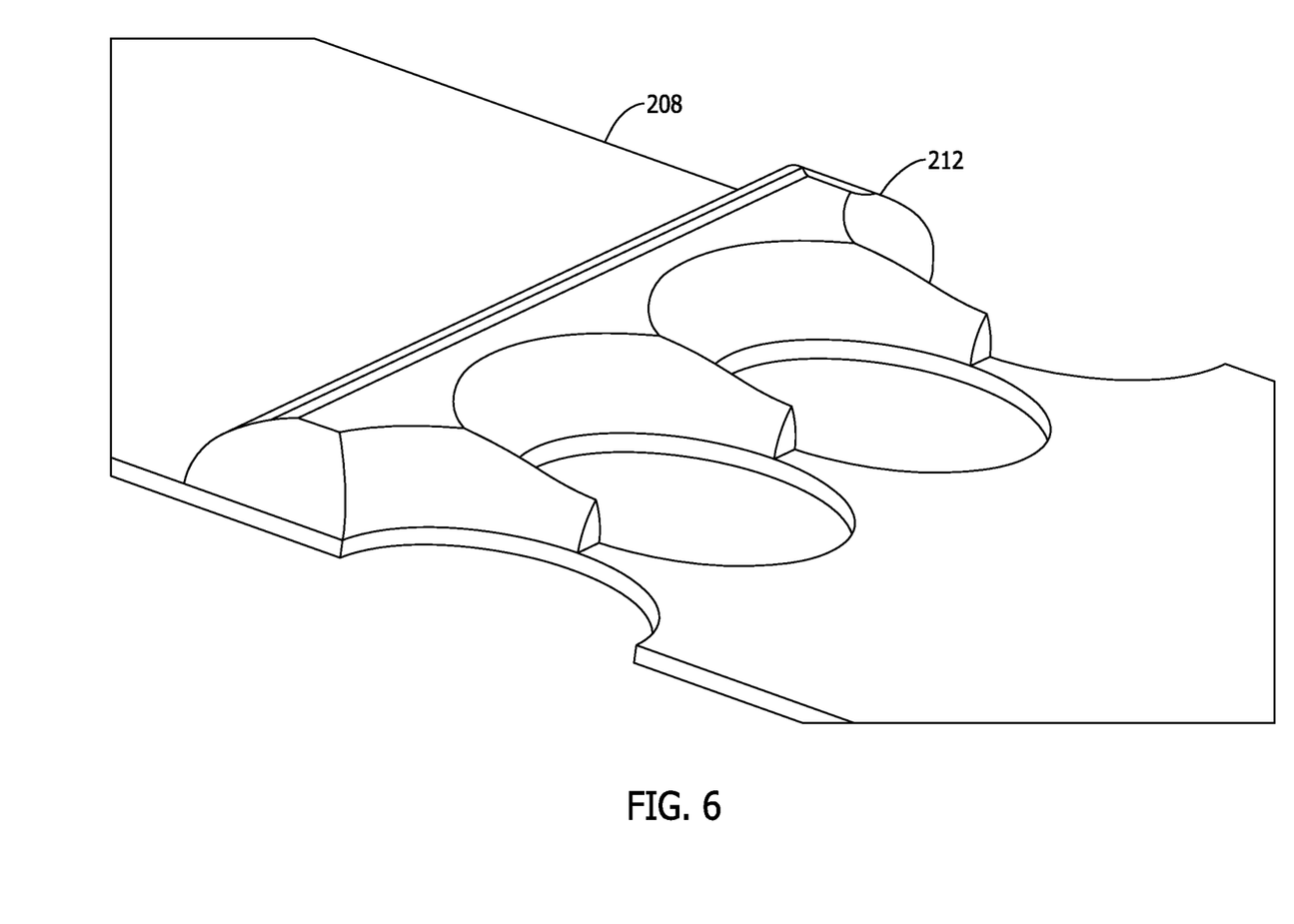
FIG. 6 is a perspective view of the fuse element assembly shown in FIG. 4.

FIG. 6 is a perspective view of the fuse element 208 shown in FIG. 4. In the present embodiment, M-spot 212 is applied to fuse element 208. M-Spot 212 is applied across the width of fuse element 208 adjacent to the weak spots. When subjected to a high current event, at least a portion of fuse element 208 melts, disintegrates or otherwise structurally fails and opens the circuit path through fuse element 208 between terminal assemblies 202, 204 (shown in FIGS. 2-5). When subjected to a high frequency electromagnetic induction flux field from the energized inductive coil of fuse holder 102 (shown in FIG. 1), at least a portion of fuse element 208 and M-spot 212 diffuse together and structurally open the circuit path through the fuse element 208 between terminal assemblies 202, 204. Load side circuitry is therefore electrically isolated from the line side circuitry, via operation of fuse holder 102 in combination with M-Spot 212, to protect load side circuit components and circuitry from damage when electrical fault conditions occur.

Figure 7:
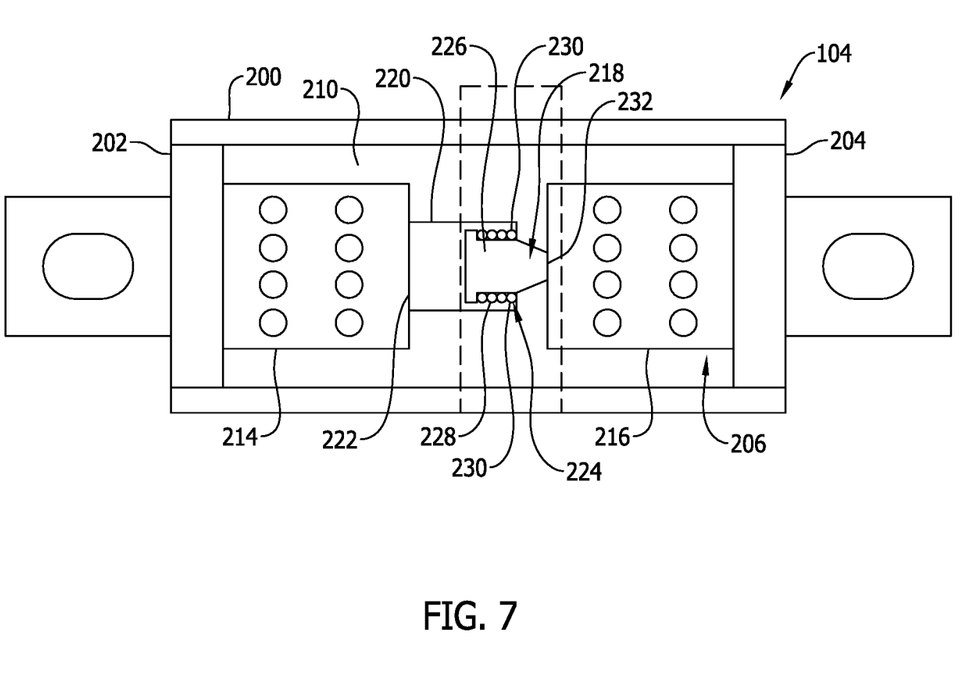
FIG. 7 is a partial top view of an electrical fuse for use in the circuit protection system of FIG. 1, revealing the internal construction thereof.
Figure 8:
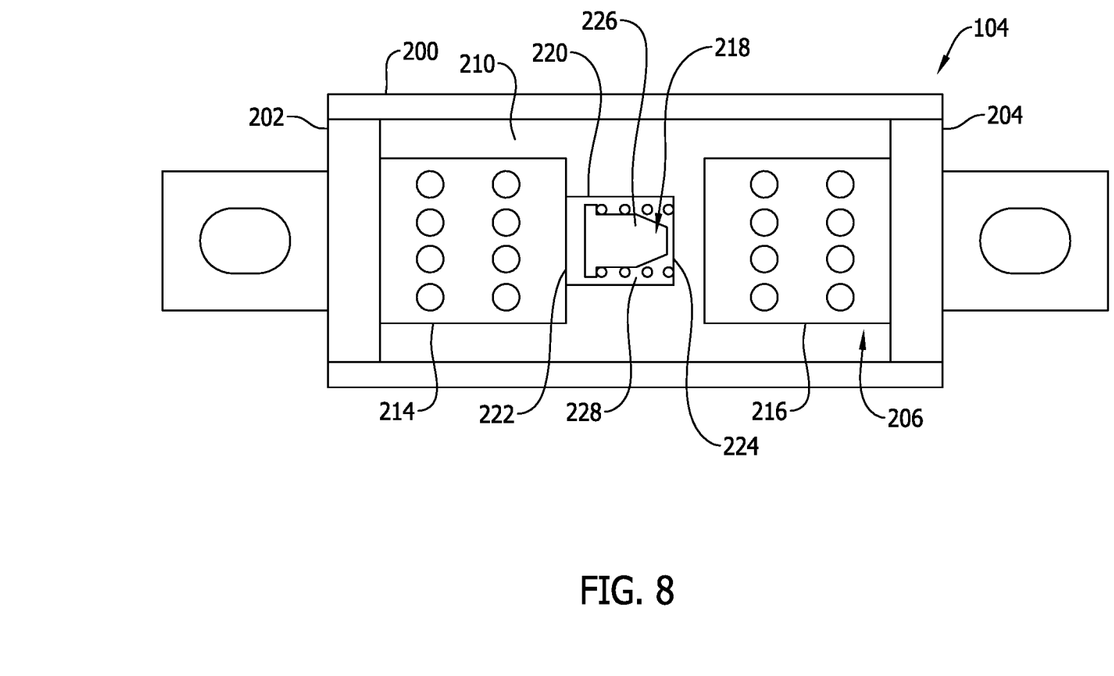
FIG. 8 is a partial top view of the electrical fuse shown in FIG. 7 after experiencing an induction heating event.

FIGS. 7 and 8 are similar views of an electrical fuse 104 for use in combination with fuse holder 102 (shown in FIG. 1), with a portion of the housing 200 shown transparent to reveal the internal construction, but FIG. 8 illustrates the effect of exposing electrical fuse 104 to an electromagnetic induction flux field generated by the induction heating element of fuse holder 102.

In the present embodiment, electrical fuse 104 includes a housing 200, first and second terminal assemblies 202, 204 configured for connection to fuse holder 102, and a fuse element assembly 206 including a first fuse element 214 and a second fuse element 216 that completes an electrical connection between the terminal assemblies 202, 204. An arc extinguishing filler medium or material 210 surrounds the fuse element assembly 206. In one contemplated embodiment, the filler medium 210 is composed of quartz silica sand and a sodium silicate binder. In the present embodiment, fuse element assembly 206 includes a thermal trigger 218. Thermal trigger 218 is fabricated using one or more conductive materials and includes a shell 220 having a first end 222 coupled to the first fuse element 214, a second end 224 coupled to a trigger 226 by at least one spring 228 and a plurality of soldered connections 230. Thermal trigger 218 is further coupled to second fuse element 216. Trigger 226 is coupled to second fuse element 216 via a soldered connection 232. Thermal trigger 218 is configured to respond to heating conditions that will not affect first fuse element 214 and second fuse element 216.

The present embodiment employs two fuse element melting mechanisms, one mechanism for high current operation (or short circuit faults) and one mechanism for low current operation (or overload faults) and on demand use via circuit protection system 100 (shown in FIG. 1). In the present embodiment, when subjected to a high current event, at least a portion of one of first fuse element 214 and second fuse element 216 melts, disintegrates, or otherwise structurally fails and opens the circuit path through the fuse element assembly 206 between terminal assemblies 202, 204. Load side circuitry is therefore electrically isolated from the line side circuitry, via operation of the fuse element 208, to protect load side circuit components and circuitry from damage when electrical fault conditions occur. In the present embodiment, when subjected to a high frequency electromagnetic induction flux field from the energized inductive coil of fuse holder 102 (shown in FIG. 1), soldered connections 230, 232 melt, disintegrate, or otherwise structurally fail, causing trigger 226 to uncouple from second fuse element 216 and spring 228 to move trigger 226 toward first end 222. The disconnection of trigger 226 from second fuse element 216 structurally opens the circuit path through the fuse element assembly 206 between terminal assemblies 202, 204. Load side circuitry is therefore electrically isolated from the line side circuitry, via operation of fuse holder 102 in combination with thermal trigger 218 to protect load side circuit components and circuitry from damage when electrical fault conditions occur.

Figure 9:
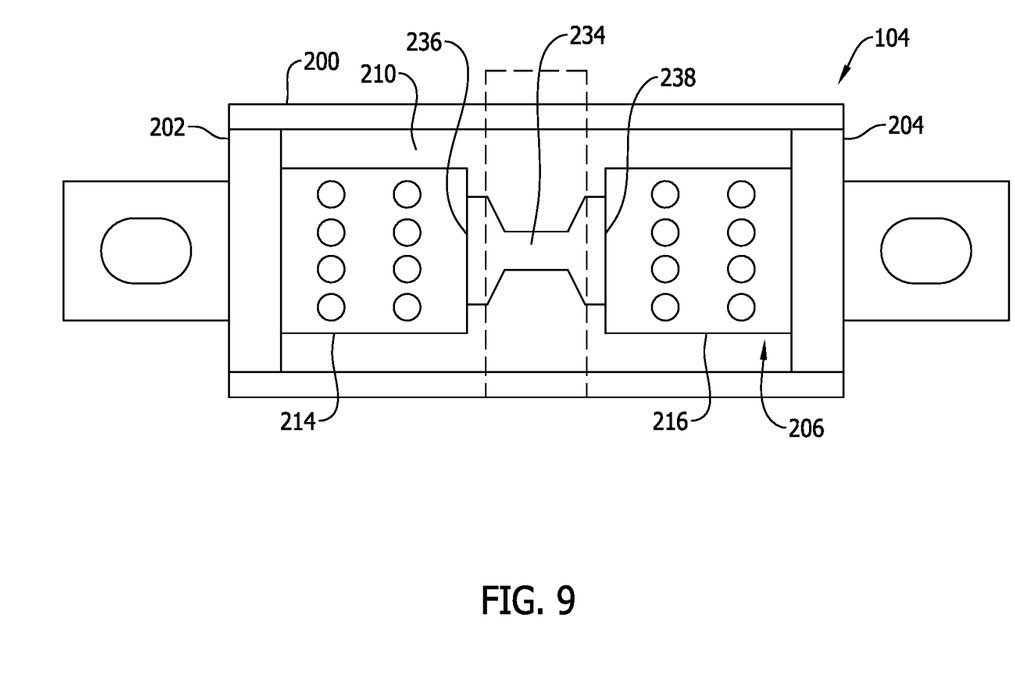
FIG. 9 is a partial top view of an electrical fuse for use in the circuit protection system of FIG. 1, revealing the internal construction thereof.
Figure 10:
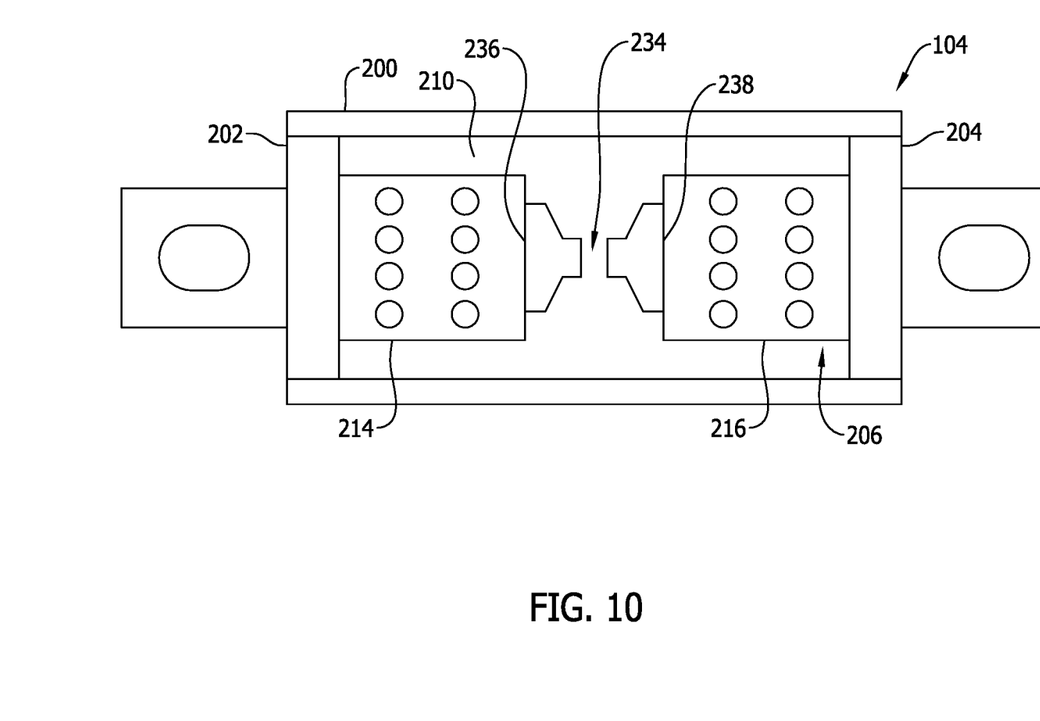
FIG. 10 is a partial top view of the electrical fuse shown in FIG. 9 after experiencing an induction heating event.

FIGS. 9 and 10 are similar views of an electrical fuse 104, with a portion of the housing 200 shown transparent to reveal the internal construction, but FIG. 10 shows electrical fuse 104 after experiencing an inductive event.

FIGS. 9 and 10 are similar views of an electrical fuse 104 for use in combination with fuse holder 102 (shown in FIG. 1), with a portion of the housing 200 shown transparent to reveal the internal construction, but FIG. 10 illustrates the effect of exposing electrical fuse 104 to an electromagnetic induction flux field generated by the induction heating element of fuse holder 102.

In the present embodiment, electrical fuse 104 includes a housing 200, first and second terminal assemblies 202, 204 configured for connection to fuse holder 102, and a fuse element assembly 206 including a first fuse element 214 and a second fuse element 216 that completes an electrical connection between the terminal assemblies 202, 204. An arc extinguishing filler medium or material 210 surrounds the fuse element assembly 206. In one contemplated embodiment, the filler medium 210 is composed of quartz silica sand and a sodium silicate binder. In the present embodiment, fuse element assembly 206 includes a soldered element 234. Soldered element 234 is fabricated using one or more conductive materials and includes a first end 236 coupled to the first fuse element 214, a second end 238 coupled to second fuse element 216. Soldered element 234 is configured to respond to heating conditions that will not affect first fuse element 214 and second fuse element 216.

The present embodiment employs two fuse element melting mechanisms, one mechanism for high current operation (or short circuit faults) and one mechanism for low current operation (or overload faults) and on demand use via circuit protection system 100 (shown in FIG. 1). In the present embodiment, when subjected to a high current event, at least a portion of one of first fuse element 214 and second fuse element 216 melts, disintegrates, or otherwise structurally fails and opens the circuit path through the fuse element assembly 206 between terminal assemblies 202, 204. Load side circuitry is therefore electrically isolated from the line side circuitry, via operation of the fuse element 208, to protect load side circuit components and circuitry from damage when electrical fault conditions occur. In the present embodiment, when subjected to a high frequency electromagnetic induction flux field from the energized inductive coil of fuse holder 102 (shown in FIG. 1), a portion of soldered element 234 melts, disintegrates, or otherwise structurally fails, thereby opening the circuit path through the fuse element assembly 206 between terminal assemblies 202, 204. Load side circuitry is therefore electrically isolated from the line side circuitry, via operation of fuse holder 102 in combination with soldered element 234 to protect load side circuit components and circuitry from damage when electrical fault conditions occur.

Figure 11:
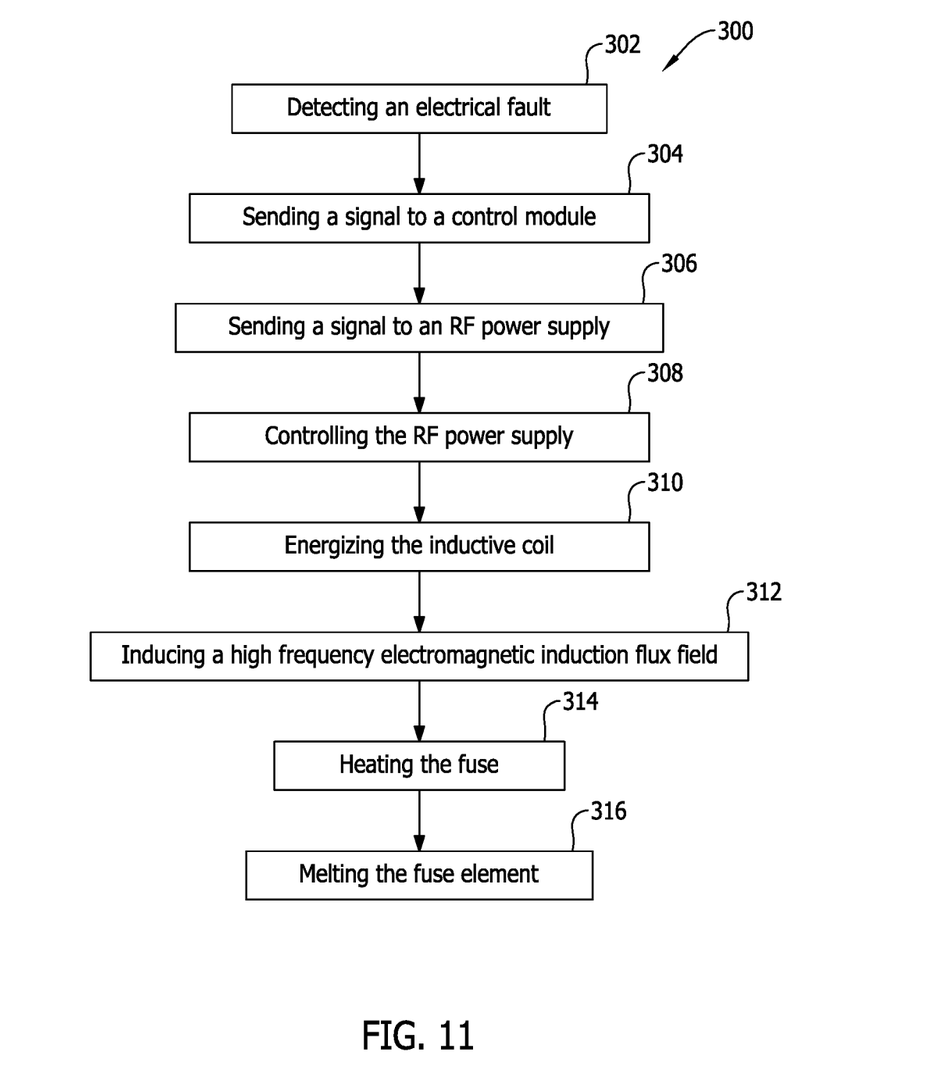
FIG. 11 is a flow chart of a first exemplary method of operating the circuit protection system shown in FIG. 1.

FIG. 11 illustrates a flowchart of a first exemplary method 300 of operating a circuit protection system 100 described above.

The method includes detecting a predetermined electrical fault condition using a current detection device at step 302.

The method further includes sending a control signal, once a predetermined fault condition is detected to a control module, wherein the control module is coupled to an RF Power Supply at step 304.

The method further includes sending a control signal from the control module to an RF Power Supply, wherein the RF power supply is coupled to a fuse holder in combination with a fuse at step 306.

The method further includes controlling the RF power supply using the control module such that high frequency power is sent to the fuse holder wherein the fuse holder comprises an inductive heating element at step 308.

The method further includes energizing the inductive heating element using the high frequency power from the RF Power supply at step 310.

The method further includes inducing a high frequency electromagnetic induction flux field at the center of the fuse element using the inductive heating element at step 312.

The method further includes heating the fuse using the high frequency electromagnetic induction flux field generated by the energized inductive heating element at step 314.

The method further includes melting the fuse element assembly, thereby opening the electrical circuit at step 316.

Optionally, heating the fuse at step 314 includes instantaneously heating the fuse using the high frequency electromagnetic induction flux field generated by the inductive heating element at step 318

Optionally, melting the fuse element assembly at step 316 includes melting the at least one solder element using the high frequency electromagnetic flux field generated by the inductive heating element, such that the electrical circuit opens at step 320

Optionally, melting the fuse element assembly at step 316 includes melting the at least one M-Spot using the high frequency electromagnetic flux field generated by the inductive heating element, such that the electrical circuit opens at step 322.

Optionally melting the fuse element assembly at step 316 includes melting the soldered connecting points on the thermal trigger using the high frequency electromagnetic flux field generated by the inductive heating element, such that the thermal trigger opens, thereby opening the electrical circuit at step 324.

Optionally, detecting a predetermined electrical fault condition at step 302 includes detecting current and voltage monitoring signals to determine if one of a short circuit event, ground fault event, overload event, or arc fault event is occurring at step 326.

Figure 12:
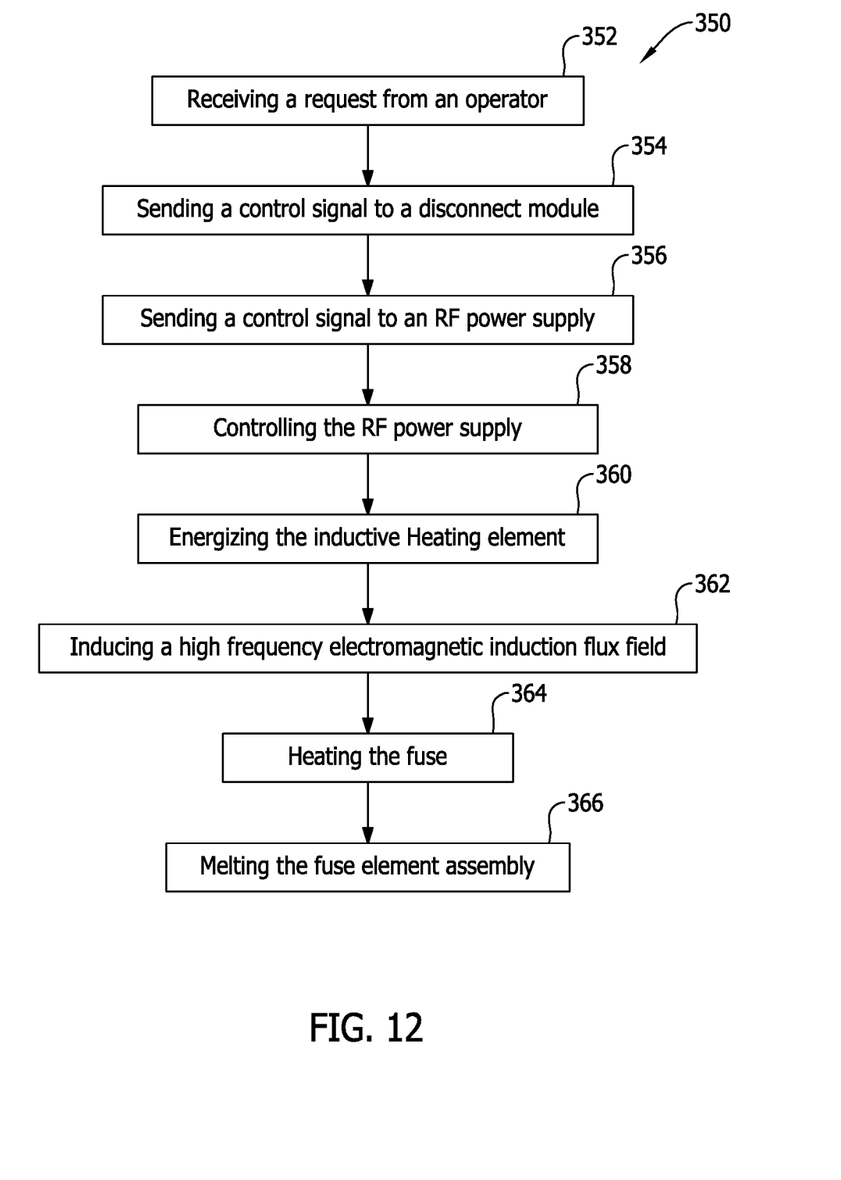
FIG. 12 is a flow chart of a second exemplary method of operating the circuit protection system shown in FIG. 1.

FIG. 12 is a flow chart of a second exemplary method 350 of operating the circuit protection system 100 shown in FIG. 1.

At step 352, a request is received from an operator.

At step 354, a control signal is sent to a disconnect module, an at step 356 a control signal is sent to the RF power supply. At step 358, the RF power supply is controlled, and the inductive heating element is energized at step 360. At step 362, an induced high frequency electromagnetic induction flux field is established, heating the fuse at step 364 and melting the fuse element assembly at step 366. Steps 354 through 366 in the method 350 generally correspond to the steps 304 through 316 described above. The methods 300 and 350 differ only in the initial steps 304 and 352.

The benefits of the inventive concepts disclosed are now believed to have been amply demonstrated in relation to the exemplary embodiments disclosed.

An embodiment of a circuit protection system has been disclosed including: at least one fuse including a fuse element; at least one inductive heating element operable to heat the fuse element; at least one control module in communication with the inductive heating element; and at least one current detection device coupled to said control module, wherein the control module is configured to operate the inductive heating element and cause the fuse element to open in response to a predetermined current condition.

The fuse holder may include an inductive heating element. Optionally, the inductive heating element may optionally be a coil. The RF power supply may optionally be configured to supply high frequency power to the at least one fuse holder. The inductive heating element may optionally be configured to be energized by the high frequency power supplied by the RF power supply. The inductive heating element may optionally be configured to heat the fuse upon being energized by the RF power supply. The inductive heating element may optionally be configured to heat the fuse such that the fuse element assembly opens outside of its time-current curve.

The circuit protection system may include a fuse holder. Optionally, the inductive heating element may be a coil. The circuit protection system may optionally include an RF power supply connected to the inductive heating element. Optionally, the inductive heating element may be configured to be energized by the high frequency power supplied by the RF power supply. The inductive heating element may be configured to heat the fuse upon being energized by the RF power supply. Optionally, the inductive heating element may be configured to heat the fuse such that the fuse element assembly melts, opening the electrical circuit. The at least one current detection device may be coupled to the at least one control module and is configured to send a control signal to the at least one RF power supply such that high frequency power is supplied to the inductive heating element when a predetermined electrical fault condition is detected.

The inductive heating element may be configured to generate a high frequency electromagnetic flux field at the center of the fuse element. Optionally, the fuse element may include apertures creating weak spots. Optionally the fuse may include a housing; first and second terminal assemblies coupled to the housing; fuse terminals with bolt-on connections; and at least one fuse element assembly extending internally in the housing and coupled between the first and second terminal assemblies, wherein the fuse element assembly may include at least one fuse element. Optionally, the fuse element assembly may include a first fuse element, a second fuse element, and at least one solder element fabricated from a solder alloy coupled between the first fuse element and said second fuse element. Optionally, the fuse element assembly may include at least one M-Spot, wherein the M-Spot is a Metcalf effect coating of a conductive material applied at the center of the fuse element adjacent to the weak spots. Optionally, the fuse element assembly may include a first fuse element, a second fuse element, and at least one thermal trigger fabricated from conductive materials coupled between said first fuse element and said second fuse element.

A method of operating a circuit protection system has also been disclosed including: detecting a predetermined electrical fault condition using a current detection device; sending a control signal, once a predetermined fault condition is detected to a control module, wherein the control module is coupled to an RF Power Supply; sending a control signal from the control module to an RF Power Supply, wherein the RF power supply is coupled to a fuse holder in combination with a fuse; controlling the RF power supply using the control module such that high frequency power is sent to the inductive heating element; energizing the inductive heating element using the high frequency power from the RF Power supply; inducing a high frequency electromagnetic induction flux field at the center of the fuse element using the inductive heating element; heating the fuse using the high frequency electromagnetic induction flux field generated by the energized inductive heating element; and melting the fuse, thereby opening the electrical circuit.

Optionally, heating the fuse may include instantaneously heating the fuse element assembly using the high frequency electromagnetic induction flux field generated by the inductive heating element. Optionally, melting the fuse may include melting the at least one solder element using the high frequency electromagnetic flux field generated by the inductive heating element, such that the electrical circuit opens. Optionally, melting the fuse may include melting the at least one M-Spot using the high frequency electromagnetic flux field generated by the inductive heating element, such that the electrical circuit opens. Optionally, melting the fuse may include melting the soldered connecting points on the thermal trigger using the high frequency electromagnetic flux field generated by the inductive heating element, such that the thermal trigger opens, thereby opening the electrical circuit. Optionally, detecting a predetermined electrical fault condition comprises detecting current and voltage monitoring signals to determine if one of a short circuit event, ground fault event, overload event, or arc fault event is occurring.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method of operating a circuit protection system comprising:
    detecting a predetermined electrical fault condition using a current detection device;
    sending a control signal, once the predetermined electrical fault condition is detected to a control module, wherein the control module is coupled to an RF power supply;
    sending a second control signal from the control module to the RF power supply, wherein the RF power supply is coupled to a fuse holder in combination with a fuse;
    controlling the RF power supply using the control module such that high frequency power is sent to an inductive heating element;
    energizing the inductive heating element using the high frequency power from the RF Power supply;
    inducing a high frequency electromagnetic induction flux field at the center of a fuse element using the inductive heating element;
    heating the fuse using the high frequency electromagnetic induction flux field generated by the energized inductive heating element; and
    melting the fuse, thereby opening an electrical circuit.

2. The method of claim 1, wherein heating the fuse comprises instantaneously heating the fuse element assembly using the high frequency electromagnetic induction flux field generated by the inductive heating element.

3. The method of claim 1, wherein melting the fuse comprises melting at least one solder element in the fuse using the high frequency electromagnetic flux field generated by the inductive heating element, such that the electrical circuit opens.

4. The method of claim 1, wherein melting the fuse comprises melting at least one M-Spot in the fuse using the high frequency electromagnetic flux field generated by the inductive heating element, such that the electrical circuit opens.

5. The method of claim 1, wherein melting the fuse comprises melting soldered connecting points on a thermal trigger in the fuse using the high frequency electromagnetic flux field generated by the inductive heating element, such that the thermal trigger opens, thereby opening the electrical circuit.

6. The method of claim 1, wherein detecting the predetermined electrical fault condition comprises detecting current and voltage monitoring signals to determine if one of a short circuit event, ground fault event, overload event, or arc fault event is occurring.

\* \* \* \* \*